United States Patent

Burzan

[15] 3,677,639

[45] July 18, 1972

[54] IDENTIFICATION CARD LOCATOR ASSEMBLY

[72] Inventor: Vernon J. Burzan, Dexter, Mich.

[73] Assignee: KMS Industries, Inc., Ann Arbor, Mich.

[22] Filed: Nov. 6, 1970

[21] Appl. No.: 87,424

[52] U.S. Cl. ....................355/76
[51] Int. Cl. ....................G03b 27/62
[58] Field of Search ....................355/75, 76; 353/95, 96

[56] References Cited

UNITED STATES PATENTS 3,463,586 8/1969 Carlson et al. ....................355/76
3,504,973 4/1970 Kolibas et al. ....................355/76 X

*Primary Examiner*—Samuel S. Matthews
*Assistant Examiner*—Michael L. Gellner
*Attorney*—Barnes, Kisselle, Raisch & Choate

[57] ABSTRACT

A holder for use selectively with an identification card in an identification system to locate the card in proper position relative to an optical axis for photographic exposure or for comparison purposes; the holder has a base plate apertured for the optical system and provided with registry pins to receive the card in proper location, and a card receiver assembly is positioned to receive a card and movable to shift the card to a registered position on the base plate for use in the optical identification system.

10 Claims, 4 Drawing Figures

Patented July 18, 1972 3,677,639

2 Sheets-Sheet 1

INVENTOR
VERNON J. BURZAN
BY
Barnes, Kisselle, Raisch & Choate
ATTORNEYS

INVENTOR
VERNON J. BURZAN
BY
Barnes, Kisselle, Raisch & Choate
ATTORNEYS

IDENTIFICATION CARD LOCATOR ASSEMBLY

This invention relates to an Identification Card Locator Assembly and more particularly to a mechanism for receiving and locating an identification card in an optical system. The card can be received and located either for the purpose of creating a proper indicia on the card to allow it to serve as an identifier, or it may receive a completed card which serves to identify the bearer.

Reference is made to a co-pending application of Thomas et al, Ser. No. 48,373, filed June 22, 1970, relating to a "Method and Apparatus for Personal Identification," and to a copending application of Lee et al, Serial No. 57,580, filed July 23, 1970 on a "Card and Holder for Fingerprint Identification System," wherein there is disclosed apparatus and structure for the identification system and card.

A personal identification card of the type carried by a person to identify himself sometimes carries a picture of the person or identifying indicia. The present invention is directed to that kind of a card but one which carries fingerprint information on a portion of the card which is transparent. The transparent portion is a photographic film which in the unexposed condition is ready to receive the fingerprint information by a proper exposure in an optical system. After exposure and proper photographic development, the film carries the information and the card must be placed in a suitable optical device such that the carried information may be compared with actual "real time" fingerprint input of the bearer to determine identity. Thus, the present invention relates to an assembly for locating an identification card in an optical system either for the purpose of exposing the film carried by the card or for the purpose of using the completed card in the identification process.

The present invention relates to details of a locator device as used in the system, and it is an object of the present invention to provide a system for locating a card with optical data contained thereon in such a manner that the card will be suitably located for use in an optical system.

It is a further object of the invention to provide a locator assembly which is so disposed that a card used with it will not be subject to stress or strain in a manner to cause warpage or distortion.

It is a further object to provide a system which can apply gentle pressure to a card to hold it in proper position.

Other objects and features of the invention will be apparent in the following description and claims in which the principles of operation are set forth in connection with the best mode presently contemplated.

Figures 1, 3, 4:
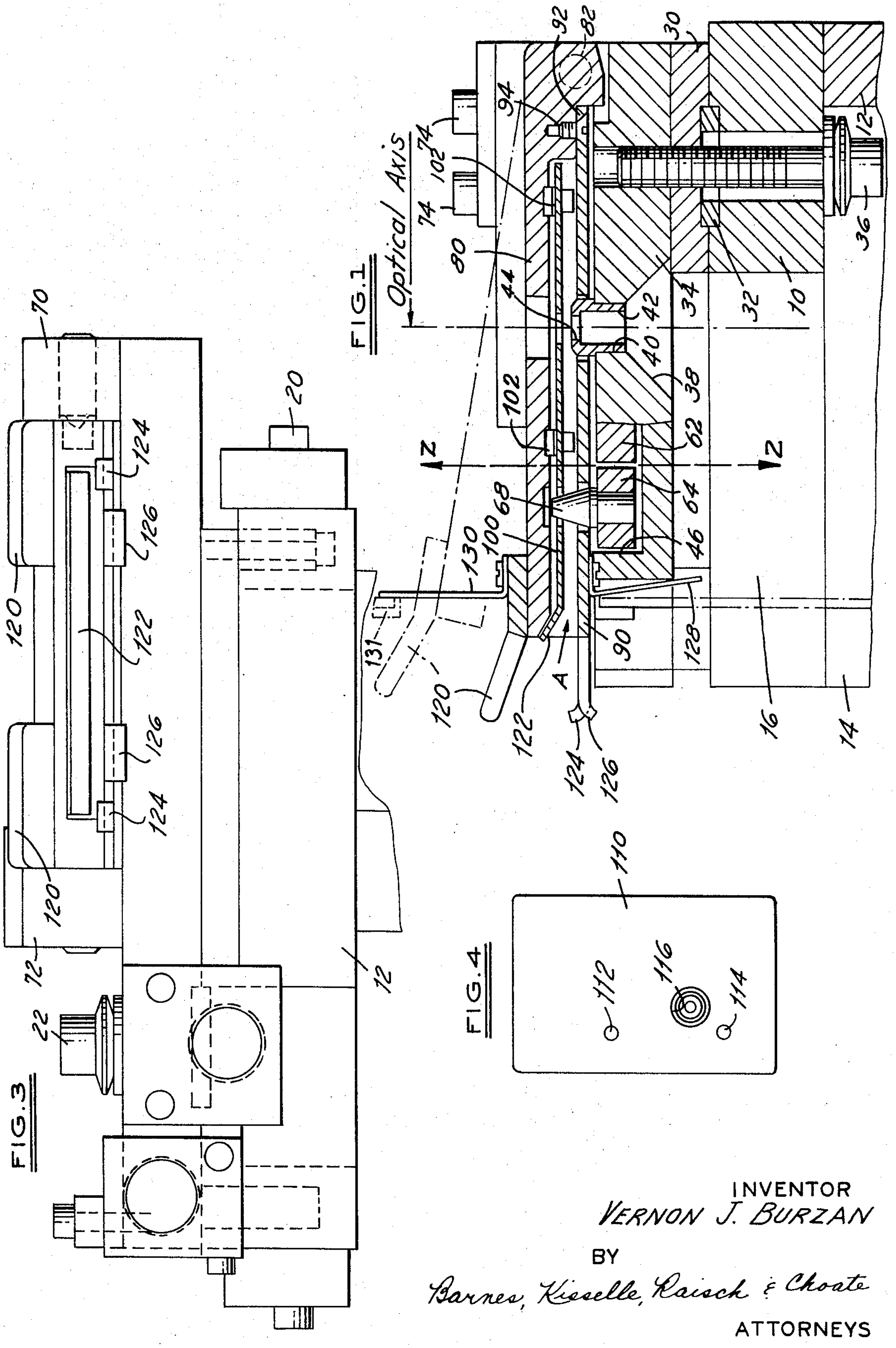
Figure 2:
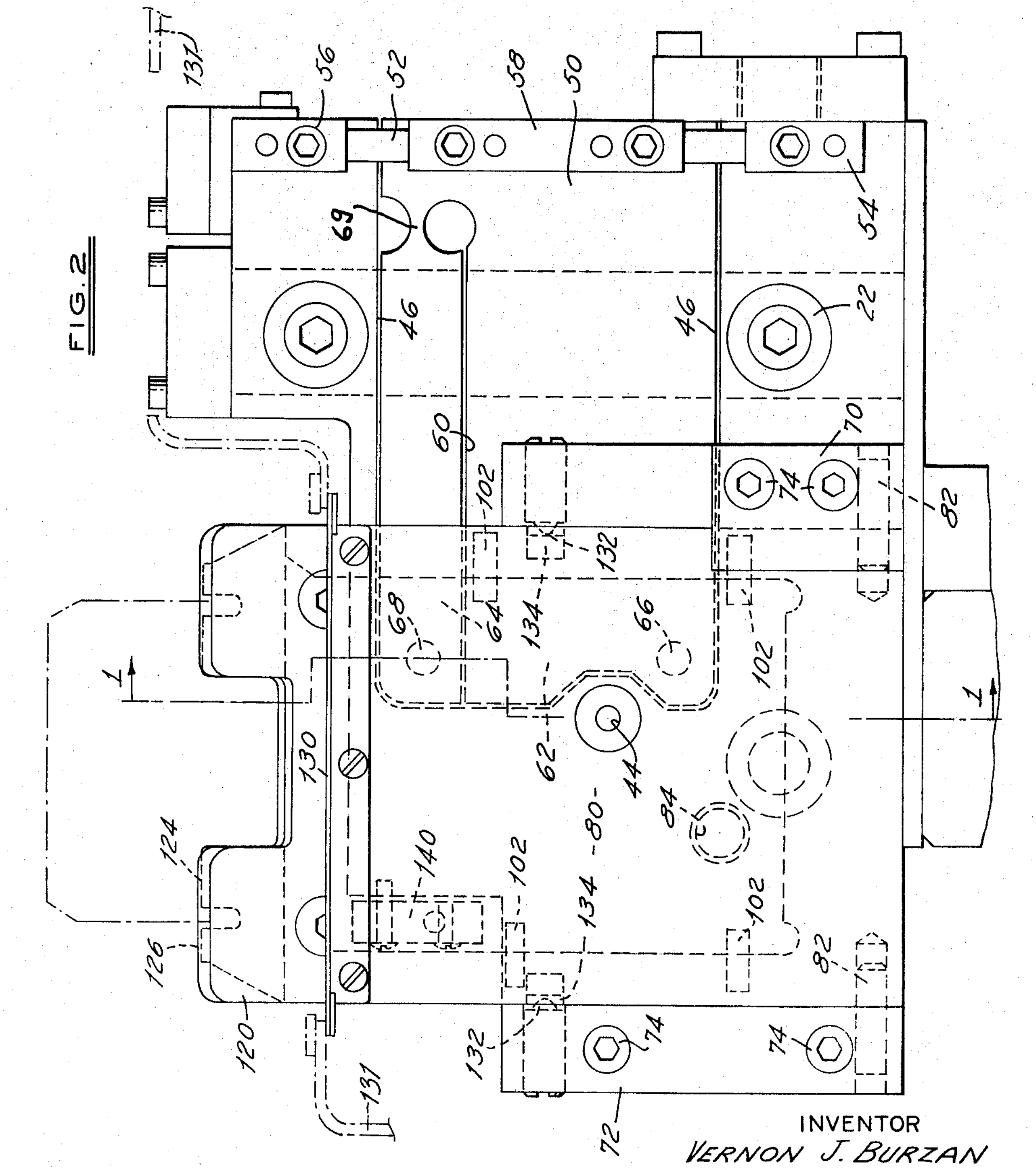

Drawings accompany the disclosure and the various views thereof may be briefly described as follows:

FIG. 1, a sectional view taken on line 1—1 of FIG. 2.

FIG. 2, a plan view of the structure showing the relationship of the parts.

FIG. 3, an entrance view of the device.

FIG. 4, a view of an identification card of the type to be used in the device.

REFERRING TO THE DRAWINGS

A support plate 10 having a vertical back plate 12 and a supporting gusset plate 14 is suitably mounted in an identification apparatus, this plate 10 having a cut-away portion at 16 to accommodate an optical axis through which light will pass in the operation of the system.

Suitable mounting and adjustment screws 20 and 22 are provided so that the plate can be adjusted relative to its mount and the parts disposed thereon. These mounting constructions are not important in connection with the present invention to be disclosed. Supported on the plate 10 is an intermediate plate 30 accurately located on plate 10 by a washer key 32 and on top of this plate 30 is a base plate 34 for the card receiving system. These parts are held together by a headed bolt 36. The plate 34 has a tapered opening 38 which terminates in a cylindrical opening 40 in which is mounted a thimble bushing 42 which projects above the plate as shown. This bushing has an opening 44 which is on the optical axis.

The plate 34 has an opening within its confines, one side of which is shown at 46 in FIG. 1 and the other outlines of which are shown in FIG. 2. This substantially rectangular opening or recess in the top of the plate is filled by a pad plate 50 which is mounted at its base on a torsion bar 52 anchored in blocks 54 and 56 at each end. The torsion bar is clamped by a block 58 which is secured to the base of the pad plate 50. The pad plate is split at 60 to provide a wide finger portion 62 and a narrow finger portion 64, each of which carries a locator pin 66 and 68 respectively. As shown in FIG. 1, these locator pins have a tapered top portion to cooperate with holes in an identification card. Thus, the pins 66 and 68 are resiliently mounted by reason of the torsion bar mount of the pad plate 50. The split design of the pad plate is for the purpose of obtaining extremely accurate location of a card. Both fingers 62 and 64 are mounted on the torsion bar 52 to provide movement or resiliency in the Z direction, that is, normal to the plane of the I.D. card and in the direction of the optical axis. This movement is necessary to assure that the tapered locator pins 66, 68 nest firmly in the locator holes of the I.D. card.

To obtain precise location of the card in the X and Y planes and yet accommodate small variations in the actual location of the locator holes in the card (due to manufacturing tolerances and thermal expansion of the card), it is necessary to provide some movement or resiliency of the pins in the Y direction. For this reason the pin attached to the wide finger is the primary locator and moves only in the Z direction by virtue of the torsion spring. The pin attached to the small finger also moves in the Z direction by virtue of the torsion spring; but, because of the narrow portion at 69, it can also move in the Y direction, (actually moves in a very slight arc). It is this feature that permits the device precisely to locate cards and still accept small variations in hole locations in various cards. The pin in the wide finger 66 may be referred to as the primary locator and the pin in the narrow finger 64, as the secondary locator.

On each side of the base plate 34 are mounting blocks 70 and 72 held in place by suitable bolts 74. These blocks mount a main plate 80 on suitable pins 82 so that the main plate 80 can pivot on these pins from the solid position shown in FIG. 1 to the dotted position.

A suitable compression spring 84 serves to urge this main plate to the "up" position. Mounted on this main plate are two additional plates, first, a support plate 90 which is positioned in a parallel relation to the main plate 80 and anchored at its inner end 92 by screws 94 to lie in spaced relation to the main plate as shown in FIG. 1. This support plate 90 will flex, however, to some degree relative to the main plate by reason of its inherent resilience. Between the main plate 80 and the support plate 90 is a pressure plate 100 held in a resiliently disposed position relative to the main plate by bowed leaf springs 102.

The three plates 80, 90 and 100 form a carriage assembly for an identification card and the relative position of the plates, as shown in solid lines in FIG. 1, provides an opening A to receive an identification card. An illustration of a card which can be used is shown in FIG. 4 where a card 110 has two locating openings 112 and 114 with a larger opening 116 in which is fastened a data carrying film intended to be positioned over the opening 44 in the thimble bushing 42. The main plate 80 has an upturned handle portion 120 which allows manual manipulation of this plate, and the plate 100 has an upturned portion 122 which serves to funnel in a card which is inserted. The plate 90 has upturned and downturned tabs 124 and 126 respectively, the upturned tabs serving as a retainer for a card which is inserted in the opening A, and which are especially useful in retaining an unexposed card when a light shield is being withdrawn to permit an exposure of a photosensitive portion of the card.

A suitable light shield 128 is mounted on the bottom of the support plate 90 to shield the optical system from undesirable light influence. A shield 130 on the handle portion of plate 80 serves the same function. Portions of an outer housing 131 are shown in dotted lines in FIGS. 1 and 2. In the two blocks 70 and 72 are spring-pressed ball plungers 132 which secure the plate 80 in its down position when it is moved manually to this position. These ball plungers cooperate with suitable recesses 134 in the side walls of the plate 80.

In the operation of the device, it will be seen that a card 110 can be inserted in the opening A when the carriage assembly composed of the plate 80 and its related plates 90 and 100 are in the "up" position. This card will be received between the plates 90 and 100 and when the plate 80 is then moved down, the card will be threaded on to the tapered projections 66 and 68 so that it will be securely and accurately located so that the portion 116 of the card will be in proper registry with the optical axis of the system. The pins 66 and 68 are mounted on the fingers of the pad plate 50 so that the openings in the card will not be enlarged by reason of undue pressure. Also, this pressure is limited by the springs which mount the pressure plate 100. A limit switch 140, shown in dotted lines in FIG. 2, is provided simply to indicate the presence or absence of a card in the system. If a card is present, the certain elements of the optical system can be actuated to institute the identification cycle. Once the identification test is complete, the plate 80 can be raised by the handle 120 and the card readily removed.

What is claimed as new is as follows:

1. A holder for use selectively with an identification card which comprises:

a. a base plate having an aperture on an axis extending through the plane of the plate, b. a positioning means associated with said plate for locating a card in a registration position relative to said aperture, c. a card holding carriage assembly comprising:

1. a main plate overlying said base plate and movable toward and away from said base plate from a receiving position to a locating position, and
2. a support plate on the base plate side of said main plate carried by and spaced from said main plate.

2. A holder for an identification card as defined in claim 1 in which said main plate and said support plate are resiliently related to permit the main plate to move toward an inserted card when said support plate is bottomed against said base plate.

3. A holder for an identification card as defined in claim 1 in which said positioning means comprises a pad plate recessed into said base plate and movable in a direction normal to the plane of the base plate, spaced projection means on said pad plate to engage an identification card, and means to mount said pad plate wherein it is movable but biased away from said base plate.

4. A holder for use selectively with an identification card which comprises:

a. a base plate having an aperture on an axis extending through the plane of the plate, b. a positioning means associated with said plate for locating a card in a registration position relative to said aperture, c. a card holding carriage assembly comprising:

1. a main plate overlying said base plate and movable toward and away from said base plate from a receiving position to a locating position,
2. a support means on the base plate side of said main plate carried by and spaced from said main plate,
3. a pressure plate interposed between and spaced from said main plate and said support means, and
4. means resiliently biasing said pressure plate toward said support plate.

5. A holder for an identification card as defined in claim 4 in which said positioning means comprises a pad plate recessed into said base plate and movable in a direction normal to the plane of the base plate, spaced projection means on said pad plate to engage an identification card, and means to mount said pad plate wherein it is movable but biased away from said base plate.

6. A holder as defined in claim 5 in which said pad plate is split between said projections to provide independently movable portions resiliently associated to permit compensatory motion as an identification card is located.

7. A holder as defined in claim 5 in which said pad plate is split between said projections to provide portions independently shiftable in a direction normal to the plane of the pad plate, at least one of said portions being mounted to move against a slight resilient bias in the direction of said plane to allow said pins to move toward or away from each other while receiving an identification card.

8. A holder as defined in claim 5 in which said pad plate is split at a distal end between said projections to provide resiliently associated portions independently shiftable relative to each other in a direction normal to and parallel to the plane of the plate, and a torsion bar mounting the proximal end of the plate to permit said plate to move against the bias of the torsion bar in a direction normal to the plane of the plate.

9. A holder as defined in claim 4 in which said support plate is mounted at one edge to said main plate and is slightly resilient to permit relative movement between said support plate and said main plate in a direction normal to the plane of said plates.

10. A holder for use selectively with an identification card which comprises:

a. a base having a card receiving surface, b. locator means on said base engageable selectively with an exposed and unexposed card to locate relative to an optical axis, and c. a carriage assembly having a recess to receive selectively an exposed and unexposed card in primary registry with said base, said assembly being mounted to move, after receiving a card, relative to said base in a direction substantially normal to the said surface thereof to engage a card in final registry with said locator means.

* * * * *